United States Patent [19]

Travis et al.

[11] Patent Number: 5,478,635
[45] Date of Patent: Dec. 26, 1995

[54] SHOE LINING FABRICS

[75] Inventors: Anthony Travis, Cockermouth; Graham Boardman, Ripon, both of United Kingdom

[73] Assignee: E. I. Du Pont de Nemours and Company, Wilmington, Del.

[21] Appl. No.: 245,406

[22] Filed: May 18, 1994

[51] Int. Cl.$^6$ .................... B32B 5/06; B32B 7/00
[52] U.S. Cl. ................ 428/221; 428/253; 428/256; 428/198; 428/373; 36/55; 429/298
[58] Field of Search ................ 36/55; 428/253, 428/286, 284, 298, 373, 198, 221

[56] References Cited

U.S. PATENT DOCUMENTS

| | | | |
|---|---|---|---|
| 4,146,663 | 3/1979 | Ikeda et al. | 428/284 |
| 4,607,439 | 8/1986 | Harada | 428/284 |
| 4,636,424 | 1/1987 | Amemiya | 428/286 |
| 4,709,490 | 5/1986 | Fottinger et al. | 36/44 |
| 5,032,450 | 7/1991 | Rechlicz et al. | 428/253 |
| 5,172,495 | 7/1990 | Fehlhaber et al. | 36/55 X |
| 5,241,709 | 8/1993 | Kufner et al. | 428/253 |
| 5,316,824 | 5/1994 | Matsuda et al. | 428/253 |
| 5,330,817 | 7/1994 | Arnott et al. | 428/298 |

FOREIGN PATENT DOCUMENTS 2447178  4/1976  Germany.

*Primary Examiner*—N. Edwards

[57] ABSTRACT

A fabric, particularly for use as a shoe lining, comprising a first knitted or woven layer laminated to a second non-woven layer whereby moisture is drawn away from the surface adjacent a moisture source through the first layer into the second layer which acts as a reservoir for the moisture.

7 Claims, No Drawings

SHOE LINING FABRICS

BACKGROUND OF THE INVENTION

This invention relates to a fabric, in particular a fabric which has improved characteristics in terms of moisture transfer.

One of the main problems connected with a fabric which is worn under conditions where a high degree of moisture in the form of perspiration is likely to be produced is that unless perspiration is removed from the surface of the body, the wearer can suffer considerable discomfort.

It is known that this problem can be solved by a fabric knitted from polyamide 66 yarn and cotton such that the polyamide forms one surface and the cotton the other. In use, the polyamide lies adjacent the moisture source, the moisture being wicked away from the source and into the cotton from which it evaporates.

This solution is satisfactory where evaporation can take place freely. However, there is still a problem when the fabric is not in contact with atmosphere, for example where the fabric is used as an inner lining in footwear where even if the outer layer can breath, ie has a degree of porosity to vapour, rapid evaporation is not possible and discomfort may be caused if moisture is produced faster than it can evaporate.

It is an object of this invention to provide a fabric which allows removal of moisture from the surface which is adjacent the moisture source and which is capable of "storing" the moisture remote from said surface whilst the fabric is in "use" ie whilst a shoe is being worn and which will, when the fabric is not in "use" ie when the shoe is removed, allow evaporation of the moisture through the surface normally adjacent the moisture source so that the fabric can dry rapidly.

SUMMARY OF THE INVENTION

According to one aspect of the invention, there is provided a fabric comprising a first knitted or woven layer laminated to a second non-woven layer whereby the moisture is drawn away from the surface adjacent a moisture source through the first layer into the second layer which acts as a reservoir for the moisture.

The layers may be laminated together by any suitable means that will allow passage of moisture. A preferred method is to spray a moisture-cured polyurethane adhesive from a highly volatile solvent such as methylene chloride, the rapid evaporation of the solvent giving a high degree of porosity to the adhesive layer.

According to a preferred aspect of the invention, the second layer is formed from heat bonded, polyamide 66/6, core-sheath heterofilaments.

The lower the decitex per filament (dpf) of the yarn, the more efficient is the wicking action. However, the abrasion resistance of the fabric is also lowered and may not be sufficient for use in shoe linings.

According to a further aspect of the invention, the first layer is formed from two yarns having differing dpf's, such that the higher dpf yarn lies in the surface adjacent the moisture source and the lower dpf yarn lies in the surface remote from the moisture source.

However, perfect separation of the yarns in this way can only be achieved easily using a double jersey knitting machine.

Surprisingly it has been found that effective wicking takes place even if the surface is formed from both yarns.

Hence according to a further aspect of the invention the higher dpf yarn need only form a major part of the surface of the layer.

Preferably the yarns have dpf's in the range 3 to 5, specifically 4, and 1 to 2, specifically 1.7, respectively.

DESCRIPTION OF THE PREFERRED EMBODIMENTS

The invention will be more readily understood from the following examples.

Example 1

A fabric was knitted on a single jersey knitting machine from false twist textured, 78f46, trilobal polyamide 66 yarn, ie yarn consisting of 46 filaments each having a decitex of 1.7, the filaments having a trilobal cross-section.

One surface of the fabric was sprayed with moisture curing polyurethane adhesive dissolved in methylene chloride and then bonded to a non-woven fabric formed from nylon 66/6 core/sheath heterofil and having an area weight of 120 g/sq.m.

A drop of water having a diameter of approximately 5 mm and containing a small amount of dye was placed on the knitted surface of the combined fabrics. It was immediately absorbed with virtually no sideways spreading and a comparison of the knitted and non-woven surfaces showed that the knitted surface was the drier.

In comparison, when a similar drop was placed on the surface of the knitted fabric alone and the non-woven fabric alone, the water spread rapidly sideways and in each case the surface was damper than the knitted surface of the combined fabrics.

Example 2

Example 1 was repeated except that the knitted fabric was produced on a double jersey machine from false twist textured, 78f20, circular, polyamide yarn and the 78f46 yarn of Example 1, with the 78f46 yarn forming the surface bonded to the non-woven fabric.

Similar results were obtained and indeed there was little difference, in terms of the spreading and relative dampness of the surfaces, between the combined fabrics and the knitted fabric alone.

Samples, having a diameter of 2 cm, of the knitted fabric alone and the combined fabrics were weighed. Water was then dripped evenly over the surface of the samples until saturation was reached. The samples were weighed again and it was found that the combined fabrics had absorbed more than 3 times as much water as the knitted fabric alone.

Example 3

Example 2 was repeated except that the knitted fabric was produced on a single jersey machine such that the 78f20 yarn formed a major proportion of the non-bonded surface.

Similar results were obtained except that a slightly greater spreading of the drop was evident.

Example 4

The combined fabrics of Examples 1,2 and 3 were tested for abrasion resistance using a standard Martindale Tester. The results showed that the fabric of Example 1 had considerably less resistance than the fabrics of Examples 2 and 3 which showed similar resistance.

Example 5

Four conventional training shoes(A,B,C and D), lined respectively with the combined fabrics of Examples 1,2 and 3, and the non-woven fabric alone, were weighed, filled with water to saturate the linings, emptied and weighed again and then stored at 20° C. Further weighings were carried out after 3, 7 and 12 hours. The results are shown in the Table.

TABLE

| SHOE | % WATER REMAINING | | | |
|------|---------|---------|---------|----------|
|      | 0 HOURS | 3 HOURS | 7 HOURS | 12 HOURS |
| A | 100 | 56 | 39 | 0 |
| B | 100 | 57 | 38 | 0 |
| C | 100 | 57 | 36 | 0 |
| D | 100 | 42 | 10 | 0 |

We claim:

1. A fabric comprising a first layer having a surface adjacent to a moisture source, said first layer being selected from the group consisting of knitted and woven fabrics and being laminated to a second non-woven layer to allow the passage of moisture whereby moisture is drawn away from the surface adjacent a moisture source through the first layer into the second layer which acts as a reservoir for the moisture, said second non-woven layer being formed from heat bonded, nylon 66 core/nylon 6 sheath heterofilaments.

2. A fabric according to claim 1, in which the first layer and the second layer are laminated together by a moisture-cured polyurethane adhesive applied by spraying from a volatile solvent.

3. A fabric according to claim 1, in which the first layer is formed from nylon 66 yarn having a decitex per filament of 1.7.

4. A fabric according to claim 1 or 2, in which the first layer is formed from two yarns, a first yarn and a second yarn, wherein the first yarn has a higher decitex than the second yarn such that the first yarn forms the major proportion of the surface remote from the second layer.

5. A fabric according to claim 4, in which the higher decitex per filament yarn forms the total surface remote from the second layer and the lower decitex per filament yarn forms the total surface adjacent the second layer.

6. A fabric according to claim 4, in which the first yarn has a decitex per filament in the range 3 co 5 and the second yarn has a decitex per filament of 1 to 2.

7. A fabric according to claim 6, in which one yarn has a decitex per filament of 4 and the other has a decitex per filament of 1.7.

* * * * *